(12) United States Patent
Forbes

(10) Patent No.: US 7,624,728 B1
(45) Date of Patent: Dec. 1, 2009

(54) IMPINGEMENT TUNNEL OVEN WITH REDUCED ENERGY CONSUMPTION AND REDUCED MAINTENANCE

(76) Inventor: David C Forbes, P.O. Box 3476, Kirkland, WA (US) 98083

(*) Notice: Subject to any disclaimer, the term of this patent is extended or adjusted under 35 U.S.C. 154(b) by 482 days.

(21) Appl. No.: 11/138,626

(22) Filed: May 26, 2005

Related U.S. Application Data

(60) Provisional application No. 60/638,888, filed on Dec. 22, 2004.

(51) Int. Cl.
*A21B 3/00* (2006.01)
(52) U.S. Cl. .................. 126/21 A; 126/19 R; 426/477; 99/443 C
(58) Field of Classification Search ............... 126/21 A, 126/21 R, 19 R, 41 C; 99/443 R, 443 C; 34/225; 219/400; 432/145, 152
See application file for complete search history.

(56) References Cited

U.S. PATENT DOCUMENTS

| | | | |
|---|---|---|---|
| 4,377,109 A | | 3/1983 | Brown |
| 4,471,750 A | * | 9/1984 | Burtea ...................... 126/21 A |
| 4,873,107 A | | 10/1989 | Archer |
| 4,881,519 A | * | 11/1989 | Henke ...................... 126/21 A |
| 5,497,760 A | * | 3/1996 | Alden et al. ............... 126/21 A |
| 5,545,874 A | * | 8/1996 | Hansson .................... 219/400 |
| 5,584,237 A | * | 12/1996 | Moshonas .................. 99/443 C |
| 5,640,896 A | * | 6/1997 | Stuck ........................ 126/41 C |
| 5,934,178 A | | 8/1999 | Caridis |
| 6,192,877 B1 | * | 2/2001 | Moshonas et al. .......... 126/21 A |
| 6,227,189 B1 | | 5/2001 | Dougherty |
| 6,481,433 B1 | | 11/2002 | Schjerven, Sr. |
| 6,539,934 B2 | | 4/2003 | Moshonas |
| 6,595,117 B1 | * | 7/2003 | Jones et al. .................... 99/386 |

FOREIGN PATENT DOCUMENTS

| EP | 0 122 966 A2 * | 10/1984 |
|---|---|---|
| EP | 0 286 759 A2 * | 10/1988 |

OTHER PUBLICATIONS

Middleby Marshall, PS500 Gas and Electric Ovens, Owner's Operating and Installation Manual, Part #46450, p. 18, Maintenance.

* cited by examiner

*Primary Examiner*—Steven B McAllister
*Assistant Examiner*—Sarah Suereth

(57) ABSTRACT

A tunnel oven using air impingement as the heat transfer mechanism is constructed for significant reduction of energy consumption and minimal labor required for cleaning. The oven is designed so that the number of airflow direction changes is minimized, and that there are no narrow ducts and no narrow spaces in the air circuit. The initial placement of thermal energy is optimized to maximize efficiency while minimizing unnecessary heat losses through exterior oven panels. The air impingement nozzle elements are on plates supported by rails and/or feet for very easy maintenance. The easy fast-out and fast-in nozzle plates are removed through access openings, and without removing the conveyor or the front of the oven. No downtime for cooling off is required. Therefore, one unskilled worker of minimal strength can disassemble the oven extremely quickly and easily for routine cleaning.

13 Claims, 13 Drawing Sheets

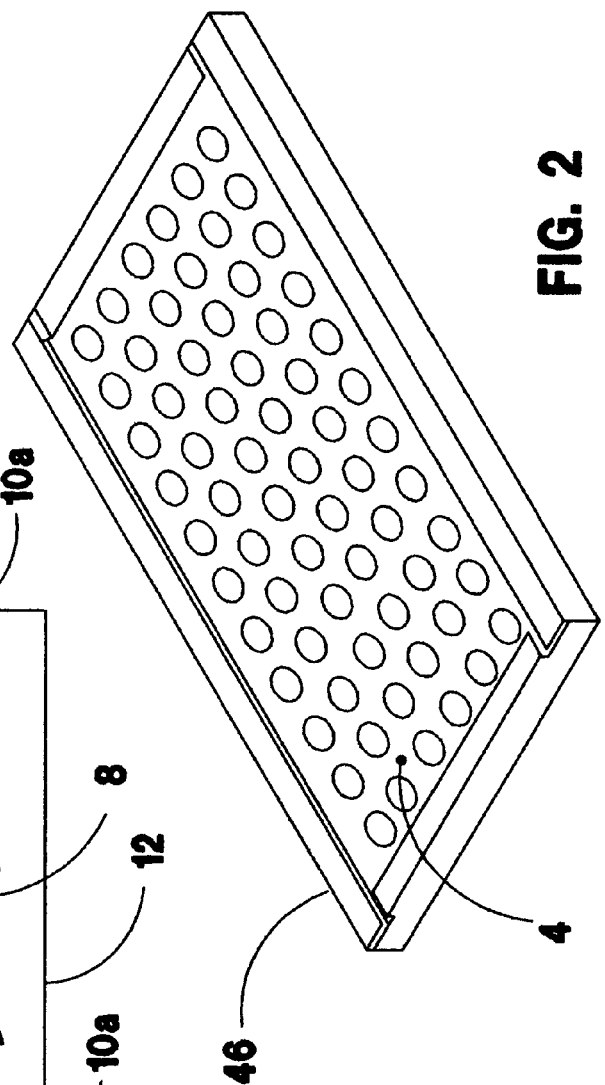
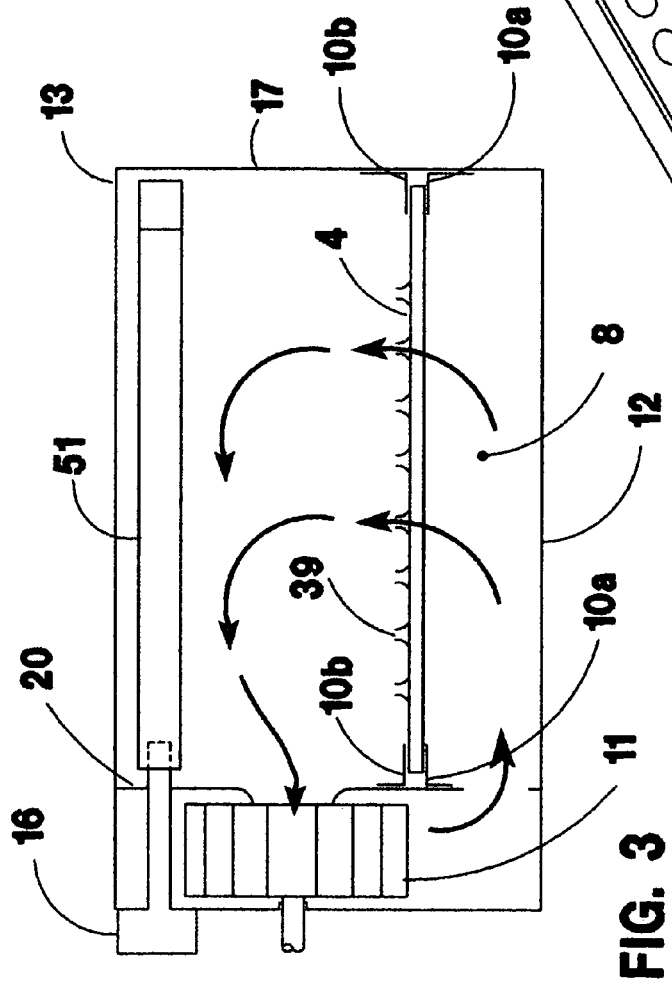
FIG. 2
FIG. 3

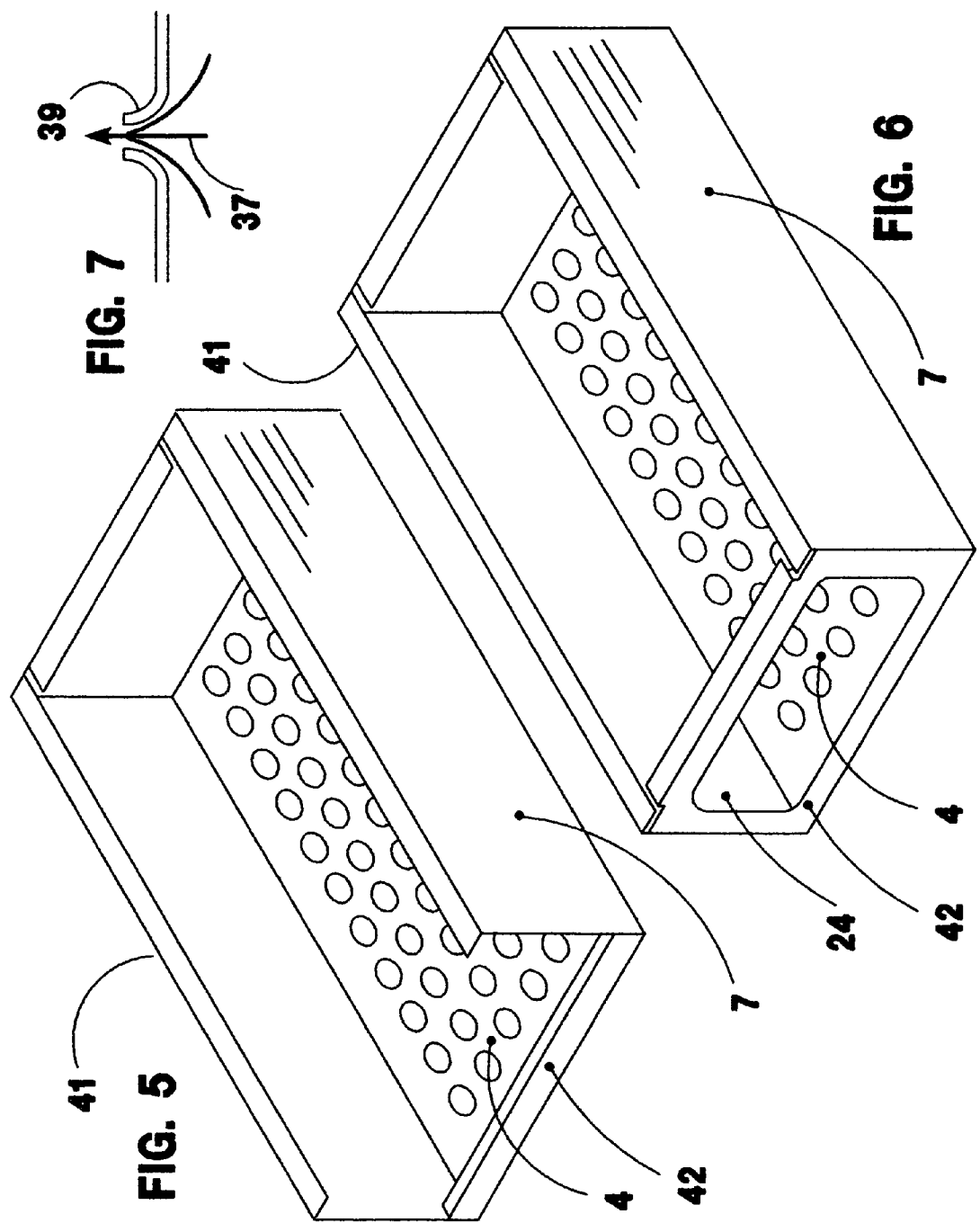

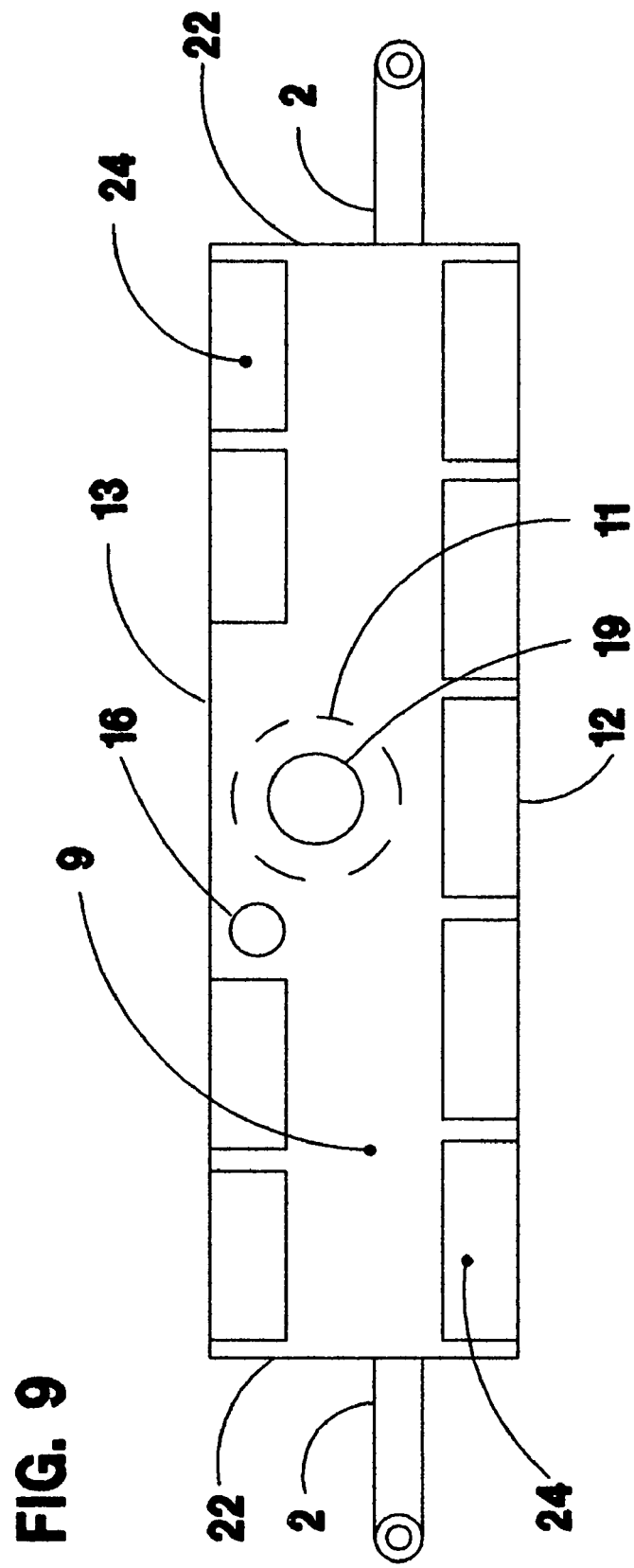

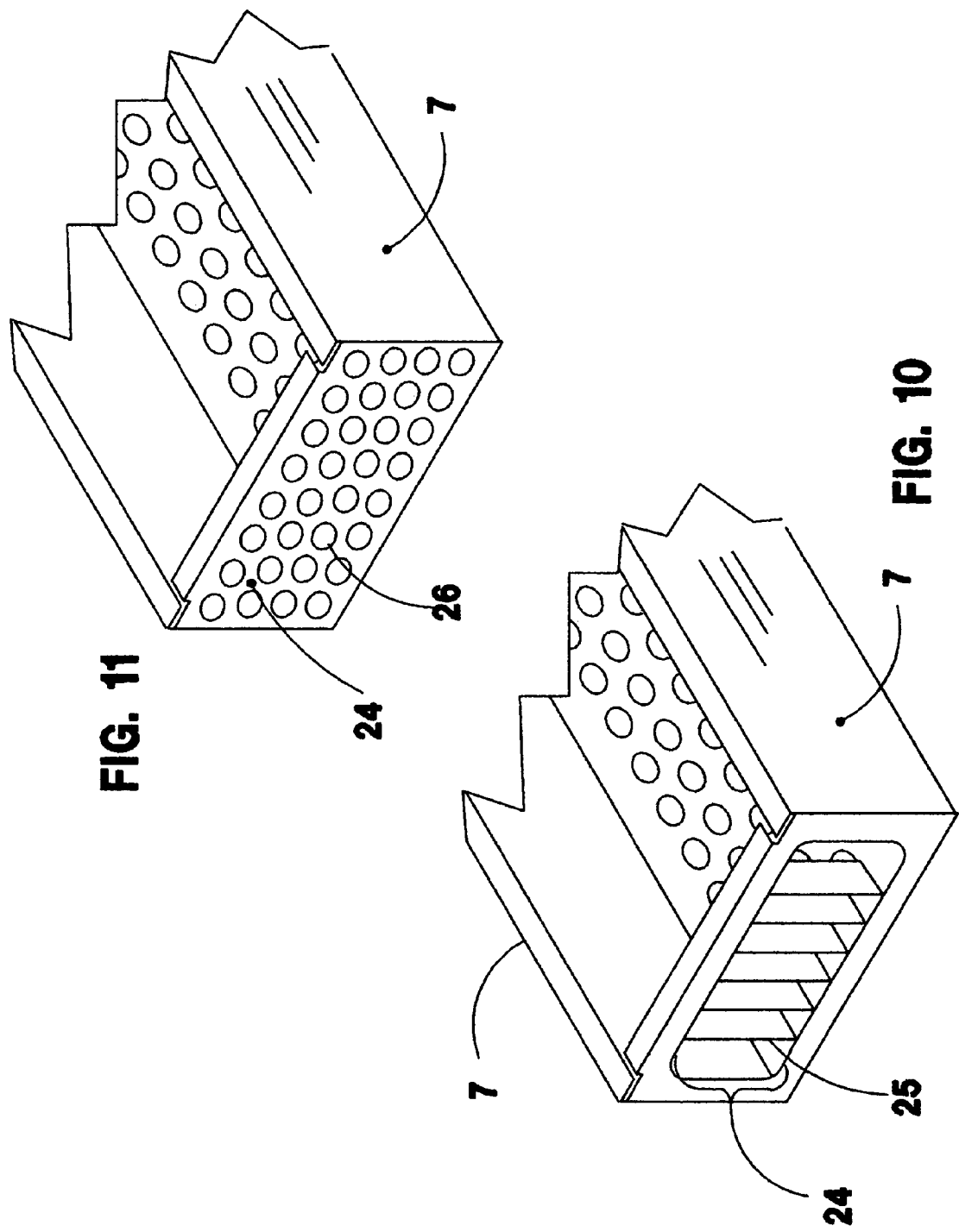

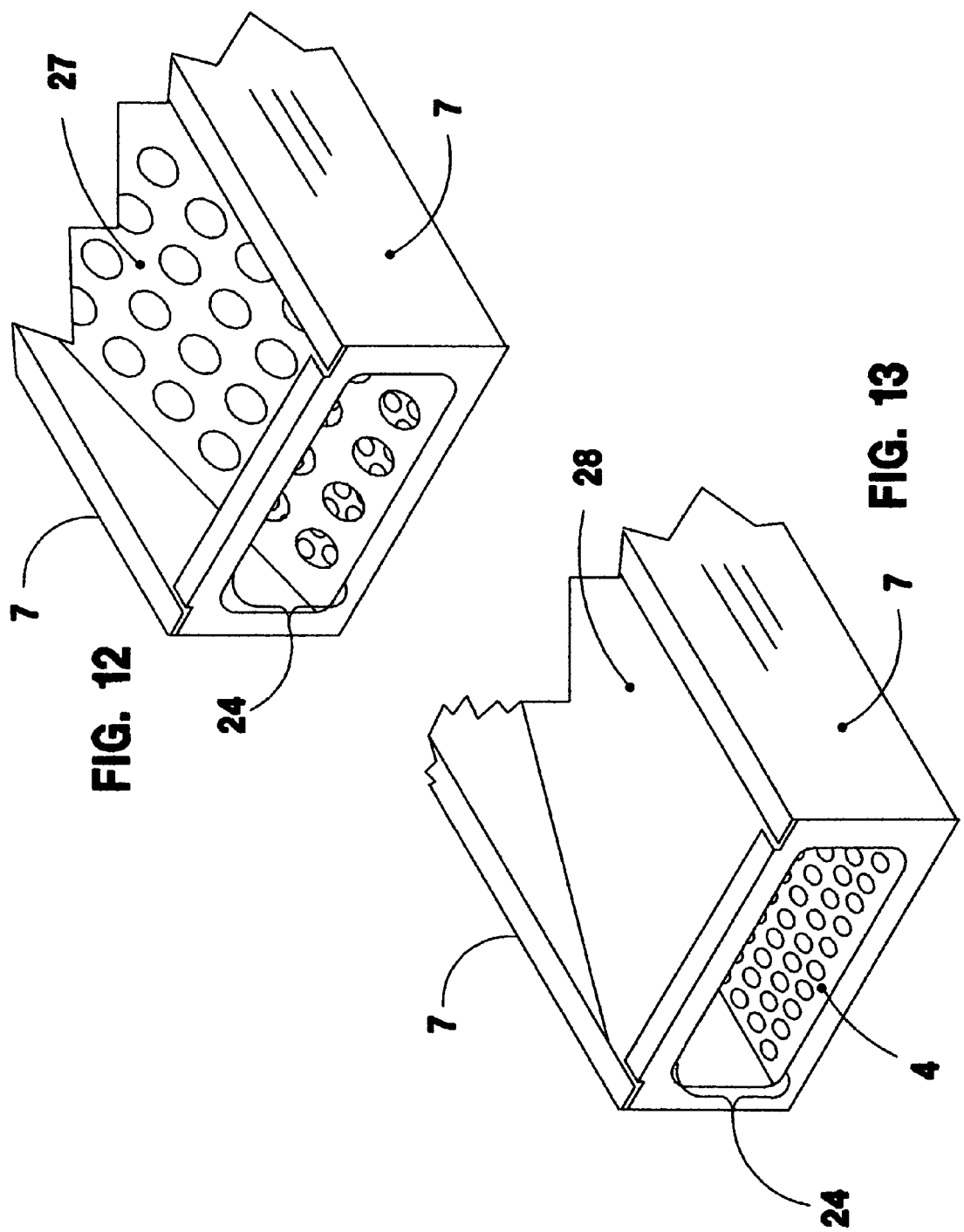

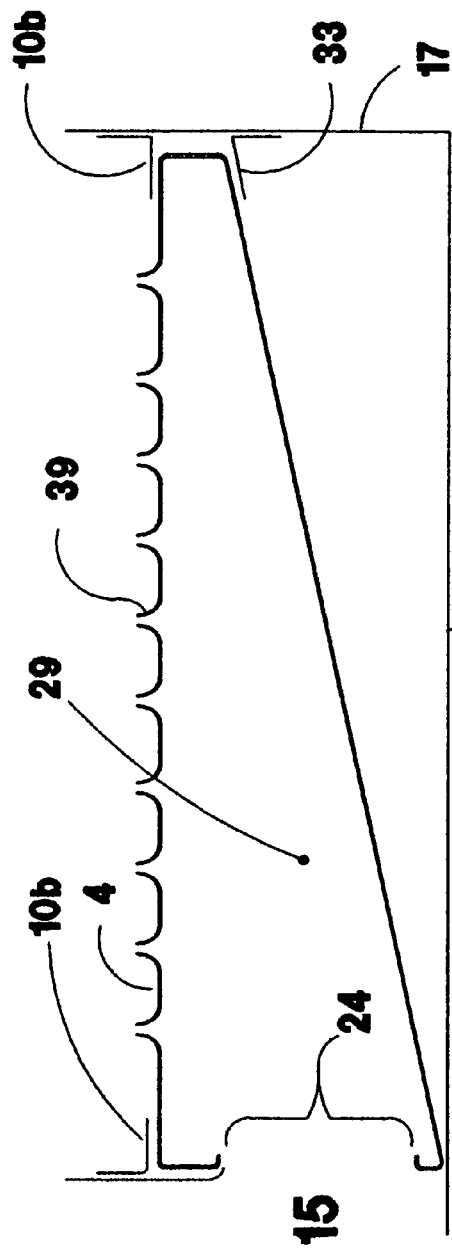
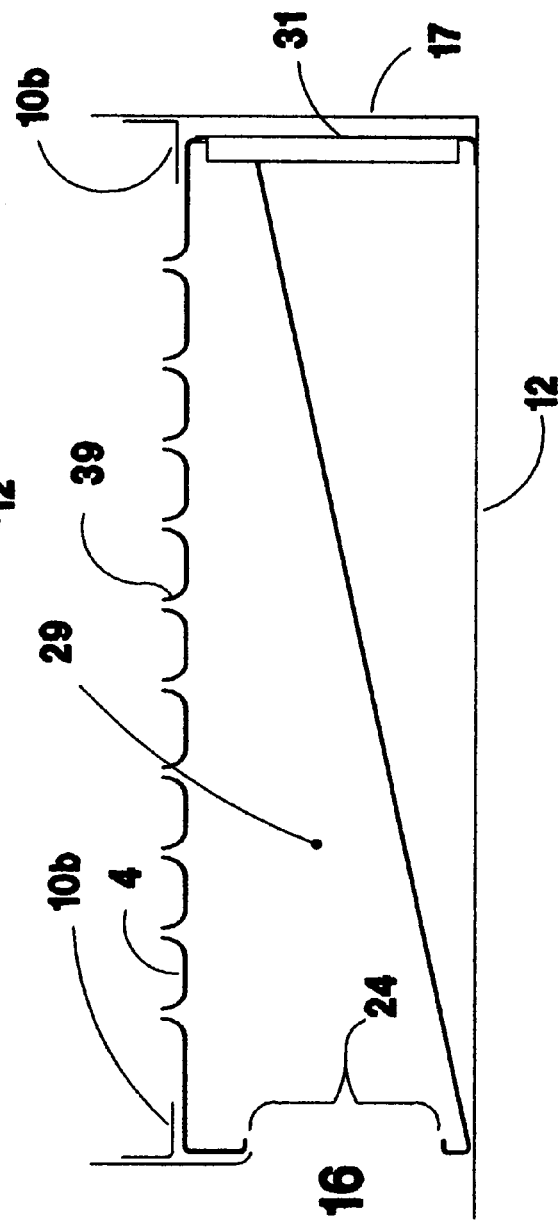
FIG. 15
FIG. 16

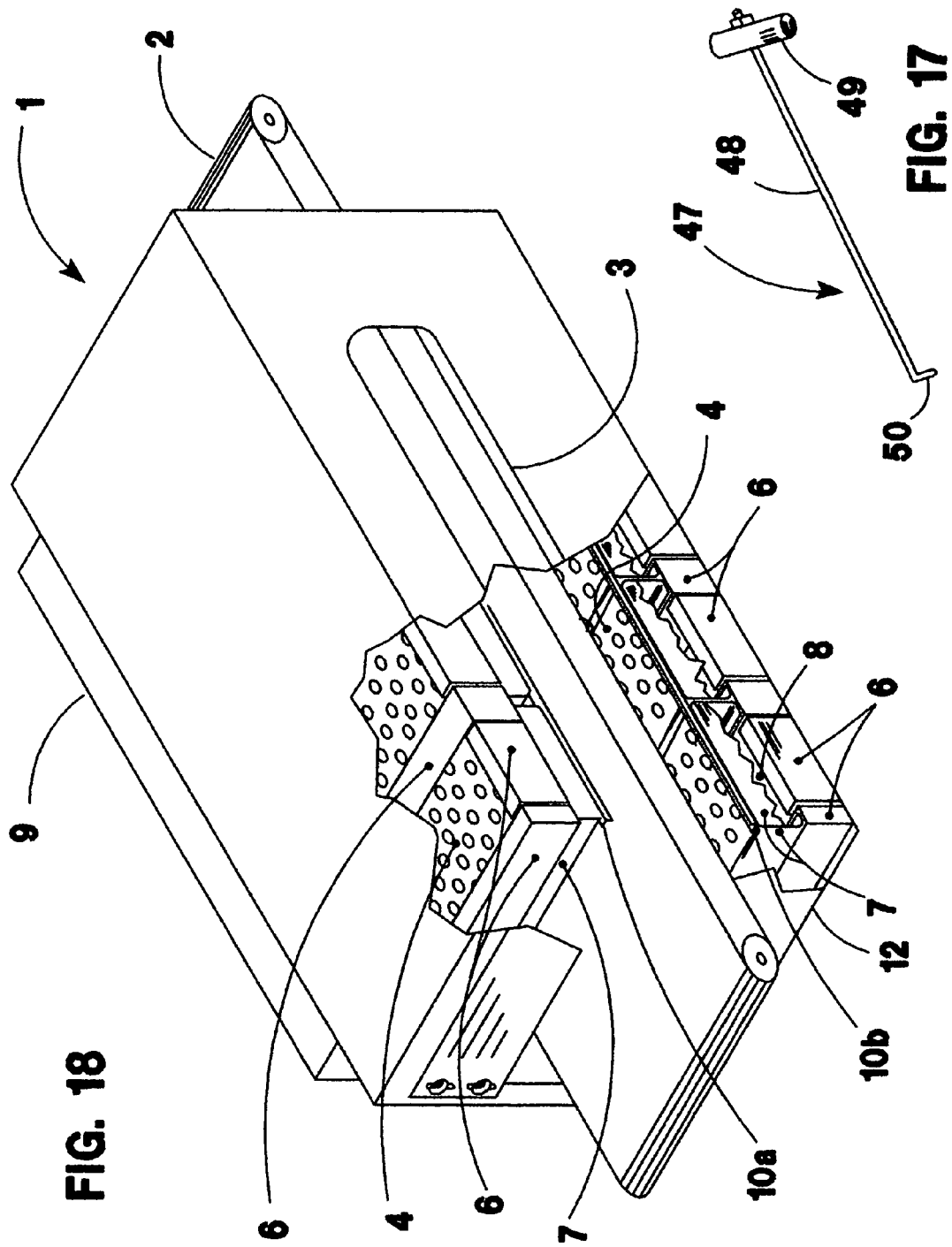

IMPINGEMENT TUNNEL OVEN WITH REDUCED ENERGY CONSUMPTION AND REDUCED MAINTENANCE

CROSS-REFERENCE TO RELATED APPLICATIONS

This application claims the benefit of provisional application No. 60/638,888, filed 2004 Dec. 22 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to improvements in conveyor type tunnel ovens utilizing air impingement heat transfer.

2. Prior Art

DEFINITIONS

Conveyor Oven: An oven for cooking products where raw products are transported through a heated space in a tunnel on a conveyor system.

Tunnel Oven: An oven where raw products are inserted in one end of a tunnel and removed cooked at the opposite end of the tunnel. Most tunnel ovens are also equipped with a conveyor.

Air Impingement Oven: An oven for cooking products where jetted streams of hot air are striking the products and/or transport pans or trays holding the products.

Oven: In this application, "oven" should be interpreted broadly beyond cooking apparatus to include similar structures used for food and non-food applications: cooling, freezing, drying, etc.

Treatment Chamber: Plenums and space within the tunnel of an oven, which are used for treating products conveyed through the tunnel.

Air: In this application "Air" should be interpreted broadly. In particular, the word Air is to include a mixture of natural atmospheric gasses and combustion products of burning fuel suitable for use in an oven. Furthermore, the word "Air" is to include all gasses and mixtures of gasses and vapors, which may be used in the oven, whether the gas is or is not a natural component of the atmosphere, and whether the gas is heated, cooled, or room temperature.

Plenum (air or gas): A chamber for holding and distributing air or other gasses. Pressure is approximately constant throughout a plenum, and thus the pressure is approximately the same at each outlet port. In general, a plenum has constant cross section and constant pressure.

Duct (air or gas): An elongated air channel characterized by approximately constant and relatively high air velocity. The cross section of a duct is reduced to maintain the air velocity as air is pushed from the duct.

Finger Ducts: Long tubular duct assemblies with integral jet nozzles used in prior art. Finger ducts are positioned over and under food or product, and are connected to a supply of air. The finger ducts are spaced apart to provide passage above and below for air to return along the top and bottom of the oven to a rear blower plenum.

Blower: A blower is a radial flow device that draws air into a central area and ejects pressurized air out at its perimeter. Blowers develop more pressure than an axial fan, but both are used in air impingement ovens.

Heat Source: Gas or oil heating apparatus with associated flame and hot burner gas, or electrical elements with associated thermal energy.

Crumbs: In this application, "crumbs" should be interpreted broadly to include all debris accumulating in an oven: cheese, sauce, toppings, non-food matter, etc.

DESCRIPTION OF PRIOR ART APPARATUS

In restaurants and food delivery businesses, food is prepared very quickly, should be of uniform consistency and quality, and the kitchen should be efficient. Therefore, stackable ovens are used to maximize kitchen productivity per square foot.

Tunnel ovens are well known in food industries, and basically comprise an elongated housing through which a cooking chamber or a "tunnel" extends longitudinally. Food is moved on a conveyor through the tunnel, and the food is subjected to a predetermined temperature profile for a predetermined amount of time. A current method of supplying heat is with jets of high velocity heated air. The top jets impinge directly onto the food, and the bottom jets impinge onto the food or onto food carrying trays.

Despite widespread use of air impingement for cooking, this method of heating, cooling, or drying items is subject to a variety of well known problems, limitations, and disadvantages. For example, cleaning finger ducts is a difficult process that requires that the ovens first be cooled and partially disassembled. The finger ducts, as will be shown, require many complicated steps and significant time to remove and disassemble.

Air impingement tunnel ovens use a plurality of finger ducts removably attached to the back of the oven and extending transversely across the oven. The finger ducts have constant width and tapered height from the back of the oven to the front of the oven. The sides facing the conveyor are pierced with sets of funnel-shaped holes acting as nozzles to create jets or streams of pressurized hot air directed at the food being cooked.

Because air currents flowing across nozzle entrances affect nozzle efficiency, there can be significant differences from one side of the oven to the other. To attempt to overcome these differences, the finger ducts are tapered to equalize air velocity along the duct. This is only partially successful because of swirling and other sources of variable airflow, so a screen or panel with apertures is placed inside the finger duct near the nozzles. Air flowing through a screen or equivalent exits with low turbulence, but resistance is significantly increased, which increases energy costs. The screen or panel is not successful in overcoming all of the performance differences of the nozzles in each finger duct assembly. Thus, food is not of uniform consistency and quality.

After impinging on food being cooked, spent air flows between spaced apart finger ducts to an open return air space above the top finger ducts and to an open return air space below the bottom finger ducts. The return air spaces are connected to return ducting on the top of the oven and on the bottom of the oven. The spent air flows to the back of the oven where it then turns to enter a back plenum with heat sources, and then turns again to enter blower wheels. Finally the blower wheels can pressurize the air, which then discharges into another plenum, which supplies the finger ducts. This convoluted path increases resistance, decreases efficiency, and increases energy costs.

The convoluted air circuits increase the size and weight of the oven. This will significantly increase shipping expenses and associated fuel cost. This will significantly increase the time and expense of installing the oven. This increases the footprint of the oven in a leasehold space, therefore increasing lease expenses.

The spent air passing over the sides and backs of the finger duct assemblies causes a cooling of the cooking air along the length of the finger ducts, thus necessitating a higher temperature for the air entering the finger ducts. This causes inconsistent temperatures at the nozzles, which results in hotter and cooler cooking areas.

Prior art finger ducts are generally supported by a flange system at a plenum end, and sometimes a bracket support at a far end. The flange system sometimes must withstand a substantial cantilevered load, and the finger ducts must be removable for maintenance operations. This requires an inherently loose fit with an accompanying leakage of hot air. This leakage is not directed at food, thus it is an energy loss.

A very important maintenance problem is that food falls on the jet nozzles, which become clogged with cheese, sauce, toppings, etc. This blocks airflow, thus affecting food quality and increasing energy costs. The oven bottom collects debris through the spaces between the finger ducts. If not cleaned daily, debris can rot, fume, smoke, attract insects during down times, etc., which introduce taste anomalies into the food.

The maintenance problem is further exacerbated because employees do not willingly disconnect and remove the conveyor or the front of the oven, disconnect and remove the finger ducts, disassemble and clean the ducts, clean the oven interior, and then put everything back together correctly. It is well known in the food industry that workers often reassemble the ovens incorrectly, thus the ovens will not cook properly.

The present invention uses simple parts that are extremely easy to install correctly. The present invention can be dismantled and cleaned quickly and easily without removing the conveyor, without removing the oven front, and without cooling the oven. Having a spare clean set of what the present invention uses in place of finger duct assemblies permits the oven to be returned to service immediately. The present invention has been designed so that the oven bottom is shielded from debris.

U.S. Pat. No. 6,481,433, "Conveyor oven having an energy management system for a modulated gas flow", by William Schjerven, 2002 Nov. 19, in FIG. 1B shows how a finger duct assembly is removed. It also illustrates that the oven has been cooled, and that the conveyor is removed before removing the finger duct assemblies.

Schjerven's FIG. 1C is an exploded view of a typical finger duct preferred by the fast food industry. FIG. 1C shows the inner aperture panel, the nozzle plate, and the duct casing. Many pieces to handle that are easily damaged, and are damaging to flesh.

Prior art finger ducts, being poorly supported, and having an internal aperture panel, are prone to rattling. Large volumes of blown air produce considerable noise, which is amplified by the complicated air circuits. The present invention uses less powerful blowers, and significantly less sheet metal stock and loose parts in the construction of the oven. The volume of blown air in the present invention is significantly lower, the air circuits are simpler, thus it is significantly quieter and more energy efficient.

The industry practice is that the oven be cooled, then the conveyor is removed, and then finally the finger ducts can be removed for cleaning. An instruction manual for "Middleby Marshall PS500 Gas and Electric Ovens" also supports this assertion. Manual Part # 46450, page 18, "II. Maintenance—Monthly", clearly instructs that the oven be cooled, power disconnected, crumb trays removed, drive motor shroud removed, drive chain removed, and then the conveyor can be removed. Two people must support and align the heavy conveyor as it is removed or inserted into the oven. The finger ducts with the jet nozzles then can be removed. Finally after all this disassembly, the finger duct assemblies can be disassembled for cleaning the nozzles, inner aperture panels, and casings. Also the oven interior is cleaned. Then the procedure is reversed for reassembly. A huge amount of work and time for a business, and expensive parts are easily damaged. Middleby Marshall is a leading manufacturer of air impingement ovens.

The removal of the conveyor requires additional space around the oven, or that the oven be moved to a different position. This results in lowered productivity per square foot and additional time to maintain the oven. This also increases leasehold expenses.

The instructions caution that incorrect reassembly of the finger ducts will result in altering the baking properties of the oven. Also, there are other parts to reassemble.

The present invention does not require the oven be cooled, or the conveyor and associated parts be removed. Each removable nozzle assembly of the present invention is one piece; therefore, the nozzle assembly is never disassembled. The present invention requires only one person with minimal strength to clean the oven very quickly.

U.S. Pat. No. 6,227,189, "Air delivery means for convection oven or cooling apparatus" by Carl Dougherty, 2001 May 8, particularly FIGS. 1 and 8, show typical tapered finger ducts like those found in other impingement oven patents. FIGS. 19 and 20 are examples of nozzles. Dougherty also illustrates the airflow in a cooking chamber; that is, out of the finger ducts, onto the food, then back between the finger ducts where a large portion of the heated air is exhausted, which is extremely wasteful of heat energy.

U.S. Pat. No. 6,539,934, "Multiconveyer convection oven" by Georges Moshanas, et al., 2003 Apr. 1, shows spaced apart finger ducts attached to a large plate with holes 44 to let the return air pass into the spaces between the finger ducts below the large plate. The tapered finger ducts can be removed after the front of the oven is removed, but does not solve the problems of debris on the lower ducts and oven bottom, or easy access for cleaning. In fact, debris will fall and be drawn into return air holes 44.

It is not disclosed how the finger ducts are attached at the plenum, or how the ducts are detached. Moshanas' large single plate requires a large floor area for workers to stand to remove the plate after the oven front is removed. The present invention is designed specifically for use with a very small space around the oven. This is very important in pizza delivery businesses that are usually in very small premises.

In over 100 patents reviewed, all used long tapered finger ducts to supply operational air to the nozzles. Clearly, the industry is fixated on tapered finger ducts.

The present invention goes against the industry practices, goes against "conventional wisdom", and therefore does not have tapered "finger ducts".

Another problem with prior art ovens using finger ducts is that the air circuit contains at least six right angle turns, or more depending on ducting details, and at least one 180 degree retro-turn. In addition, the long narrow finger ducts using internal baffles with apertures cause considerable resistance and pressure drop. Also, all the circulating air has to flow through the spaces between the finger ducts. Convoluted air circuits go above the top finger ducts and below the bottom finger ducts before the return air can enter the ducting that connects to the back plenum housing the blower wheels. The prior art design loses energy through excessive flow resistance from turnings of the airflow, moving large volumes of air, high pressures, and general heat loss.

The present invention minimizes changes in airflow direction, has no convoluted air circuits involving many turns, has no narrow ducts, and has no narrow spaces in the air circuit. All air passages are large open spaces, essentially plenums.

Industry standards of today use jets of high velocity air. A few patents recite the preferred jet velocity for their described embodiments. U.S. Pat. No. 4,377,109, "Apparatus for baking food products such as pizzas and the like" by Ernest C. Brown et al., 1983 Mar. 22, prefers 4000 ft/min. U.S. Pat. No. 5,934,178, "Air impingement oven" by Andrew A. Caridis, et al., 1999 Aug. 10, prefers 9000 ft/min. U.S. Pat. No. 4,873,107, "Air impingement tunnel apparatus" by Virgil L. Archer, 1989 Oct. 10, in its background section asserts that 8000 ft/min is conventional.

It is clear from reviewing US patents, that the conventional way to design the prior art impingement ovens is with high jet velocities. The qualities of many foods suffer due to excessive drying. These ovens are very noisy. These extreme jet velocities require excessive energy. There is significant turbulence, thus pushing the hot cooking air out the ends of the oven wasting valuable heat energy.

It has been found that the present invention can use significantly lower velocity jets, with commensurate lower volume of blown hot air, less leakage, less noise, and less power being required. There will be a significant reduction in energy consumption.

Another problem with the prior art ovens is that a heat source is very close to exterior panels in a very confined area causing excessive energy losses through the panels. This also puts excessive wear on blower wheels and shafts that then transfer the heat at higher temperatures to blower bearings, motors, pulleys, belts, and electronic or electric components. This increases energy consumption, and dramatically shortens the life of equipment.

OBJECTS AND ADVANTAGES

It is an object and advantage to provide an air impingement tunnel oven apparatus to significantly reduce energy consumption compared to energy used by the prior art. Several inventive details are included for saving energy including lower jet velocities, lower air circuit pressures, lower circulating volume, simple airflow path, improved placement of heat source, conveyor barriers, etc.

It is another object and advantage to provide an air impingement tunnel oven apparatus to significantly reduce energy used for air conditioning in businesses. By more efficient design, there is less waste of exhausted heat, less heat loss through exterior oven panels, reduction of blower power, and thus a reduction of heat in the businesses.

It is another object and advantage to provide an air impingement tunnel oven apparatus, which has an improved air impingement delivery system. This system eliminates or minimizes above mentioned and other problems and limitations associated with conventional high velocity air impingement systems.

It is another object and advantage to permit fast and easy disassembly for cleaning without cooling the oven to room temperature, and then re-heating.

It is another object and advantage to permit disassembly for cleaning without removing the conveyor and associated parts, or without removing the front panel of the oven, as is required by the prior art.

It is another object and advantage to permit disassembly for cleaning and maintenance of the oven by one person with minimal strength.

It is another object and advantage to permit disassembly for cleaning and maintenance of the oven without moving the oven or allowing for additional space.

It is another object and advantage to permit cleaning the nozzle assemblies without having to disassemble them as is required by the prior art.

It is another object and advantage to reduce the complexity and to reduce the number of components making up the air circuit and flow control system of the oven.

It is another object and advantage to have removable and replaceable parts inexpensive enough to permit stocking a set of clean spare parts. In particular, by having a spare set of clean nozzle plates, routine servicing would take only a few minutes.

It is another object and advantage to permit a very easy substitution of all nozzle plates within a few minutes. This allows different patterns of nozzles and/or numbers of jet nozzles to be installed to accommodate different products.

It is another object and advantage to reduce crumbs that may be in the bottom of the oven to nearly zero. Thus, reducing the frequency of cleaning the oven bottom.

It is another object and advantage to significantly reduce the number of parts, complexity of parts, and number of manufacturing steps. Thus, the oven will be easier to produce and will cost less. Also, repair and maintenance costs will be greatly reduced.

It is another object and advantage to significantly reduce the weight and size of the oven. This will significantly reduce shipping expenses and associated fuel cost. This will significantly reduce the time and expense of installing the oven. This will significantly reduce leasehold expenses associated with the footprint of the oven.

It is another object and advantage to significantly reduce the cost of learning how to use and maintain the oven.

Further objects and advantages of the present invention will become apparent from a consideration of the drawings and ensuing description.

SUMMARY

The finger ducts and the spaces between of the prior art are replaced with a set of contiguous perforated plates (nozzle plates 4). The perforations are jet nozzles. The nozzle plates form a continuous surface of jet nozzles, or other patterns that an operator might use including blank nozzle plates (no nozzles on the plate) or open spaces. Rails support the top nozzle plates, and the bottom nozzle plates are supported on rails, panels, walls, or integral feet. The top nozzle plates may also be supported by panels, walls, or integral arms removably attached to the treatment chamber panels. The oven may be divided into one or more plenum chambers 8. Divisions, when used, can be formed by at least one panel extending from the nozzle plates 4, or by at least one panel extending from treatment chamber panels, or by a combination of both.

Reduced nozzle velocities, reduced blower volume, and reduced volume of burner air, significantly lowers the overall energy used by the oven for cooking food. Reducing burner air reduces wasted hot air exhausted from the oven.

The present invention is characterized by low jet velocity, low air circuit pressures, low circulating volumes, and fewer changes of direction of the airflow; resulting in lowered blower power requirements. In contrast, the prior art uses high jet velocity, high air circuit pressures, high circulating volumes, and more changes of direction of the airflow; resulting in higher blower power requirements and wasted heat.

Unlike the prior art, space is usually not necessary between nozzle plates, thus few crumbs will be on the bottom of the oven. These are easily removed with a brush.

The present invention conserves energy by placing a heat source in the treatment chamber. The chamber has a much greater volume to evenly disperse the heat than any other area. This allows higher temperature air from the heat source to immediately blend with lower temperature return air, and the blending continues as they are drawn towards the blower wheel. Thus, excessive heat is not concentrated on any panels of the oven. Energy consumption is reduced when heat losses through exterior panels are minimized. Heat loss is further minimized with this improvement when ovens are stacked. Temperatures are significantly lowered for most components of the oven by not concentrating the heat as in the prior art. The blower wheel, blower shaft, motor, bearings, pulleys, belts, electric components, and electronic components all operate at a lower temperature. A lower temperature to the motor and the bearings lowers energy consumption. All components will have a longer life span.

DRAWINGS

FIG. 2 is a preferred panel-less embodiment of a nozzle plate.

FIG. 3 is a sectional view showing an installed panel-less embodiment of a nozzle plate.

FIG. 5 is a view inside one embodiment of a nozzle plenum box closed on 3 sides and self-supporting.

FIG. 6 is a view inside another embodiment of a nozzle plenum box with an opening on an inlet side.

FIG. 7 is a sectional view of an engineered nozzle shape.

FIG. 9 is a sectional view of a tunnel oven showing details of openings between a blower plenum and a treatment chamber.

FIG. 10 is a partial view showing air guide vanes for reducing swirl in a nozzle plenum.

FIG. 11 is a partial view showing an aperture panel in a nozzle plenum.

FIG. 12 is a partial view of an alternative placement of a swirl reducing aperture panel.

FIG. 13 is a partial view of an alternative nozzle plenum design with a panel forming a tapered air channel.

FIG. 15 is a sectional view of a nozzle plenum with a tapered air channel supported by an angled rail system at the distal end.

FIG. 16 is a sectional view of a nozzle plenum having a leg and foot support.

FIG. 17 is an embodiment of a nozzle plate-removing tool.

FIG. 18 is a cutaway view of an alternative method of supporting nozzle plates.

REFERENCE NUMERALS

1 Tunnel oven, overall.
2 Conveyor.
3 Windowed access door.
4 Nozzle plates, including an array of nozzles 39.
5 Not used.
6 Panels (extending from plenums).
7 Panels (attached to nozzle plates).
8 Nozzle plenum (hot air distribution plenum supplying engineered nozzles with pressurized hot air).
9 Blower plenum (hot air distribution plenum, which supplies nozzle plenums with pressurized hot air).
10*a* Support rails for nozzle plates, treatment chamber upper, lower, front, and back.
10*b* Optional rails for nozzle plates, treatment chamber upper, lower, front, and back.
11 Blower wheel.
12 Oven bottom panel.
13 Oven top panel.
14 Safety shield and baffle for blower wheel.
15 Louvered panel.
16 Heat source.
17 Front panel of a treatment chamber.
18 Rear panel of a blower plenum
19 Return air opening between treatment chamber and blower wheel.
20 Back panel of a treatment chamber.
21 Inlet port to blower wheel. Air passage in back panel of treatment chamber to channel air to blower.
22 End panels.
23, 23*a*, 23*b* Air-turning deflector vanes.
24 Opening between blower plenum and nozzle plenum.
25 Anti swirl vanes in opening space 24.
26 Anti swirl apertures in opening space 24.
27 Inner aperture panel.
28 Tapered air channel panel.
29 Tapered nozzle plenum.
30 Fixed sloped floor.
31 Leg and foot support.
32 Not used.
33 Angled rail system.
34 Not used.
35*a*, 35*b* Conveyor barriers.
36 Not used.
37 Airflow into and then out of nozzle.
38 Not used.
39 Engineered nozzle used in nozzle array on nozzle plates 4.
40 Not used.
41 Nozzle plate support foot.
42 Plenum end stiffener.
43 Removable access panel, lower.
44 Removable access panel, upper.
45 Not used.
46 Nozzle plate stiffener.
47 Nozzle plate removing tool.
48 Shank of nozzle plate removing tool.
49 Handle of nozzle plate removing tool.

50 End hook of nozzle plate removing tool.
51 Heat diffusing tube.
52 Louvered slots for return air.
53 Return plenum.

DETAILED DESCRIPTION OF THE INVENTION

A typical medium sized tunnel oven will be approximately 24 inches high, 60 inches long, 46 inches wide plus a motor length on the outside, and 34 inches wide inside. These dimensions may be increased or decreased to suit engineering, thermal treatment requirements of the products, specific requirements of the businesses, etc. Insulation used in the exterior panels may be conventional and is not detailed.

Cooking temperatures of approximately 400 to 550 degrees F. are desired. The oven uses jets of hot air impinging directly on food or food carrying trays. The resulting high rate of heat transfer permits thin type foods such as pizzas to be cooked in as little as 5 minutes. The pizzas are put on a conveyor, and are subjected to a predetermined temperature profile for a predetermined amount of time.

Figure 1:
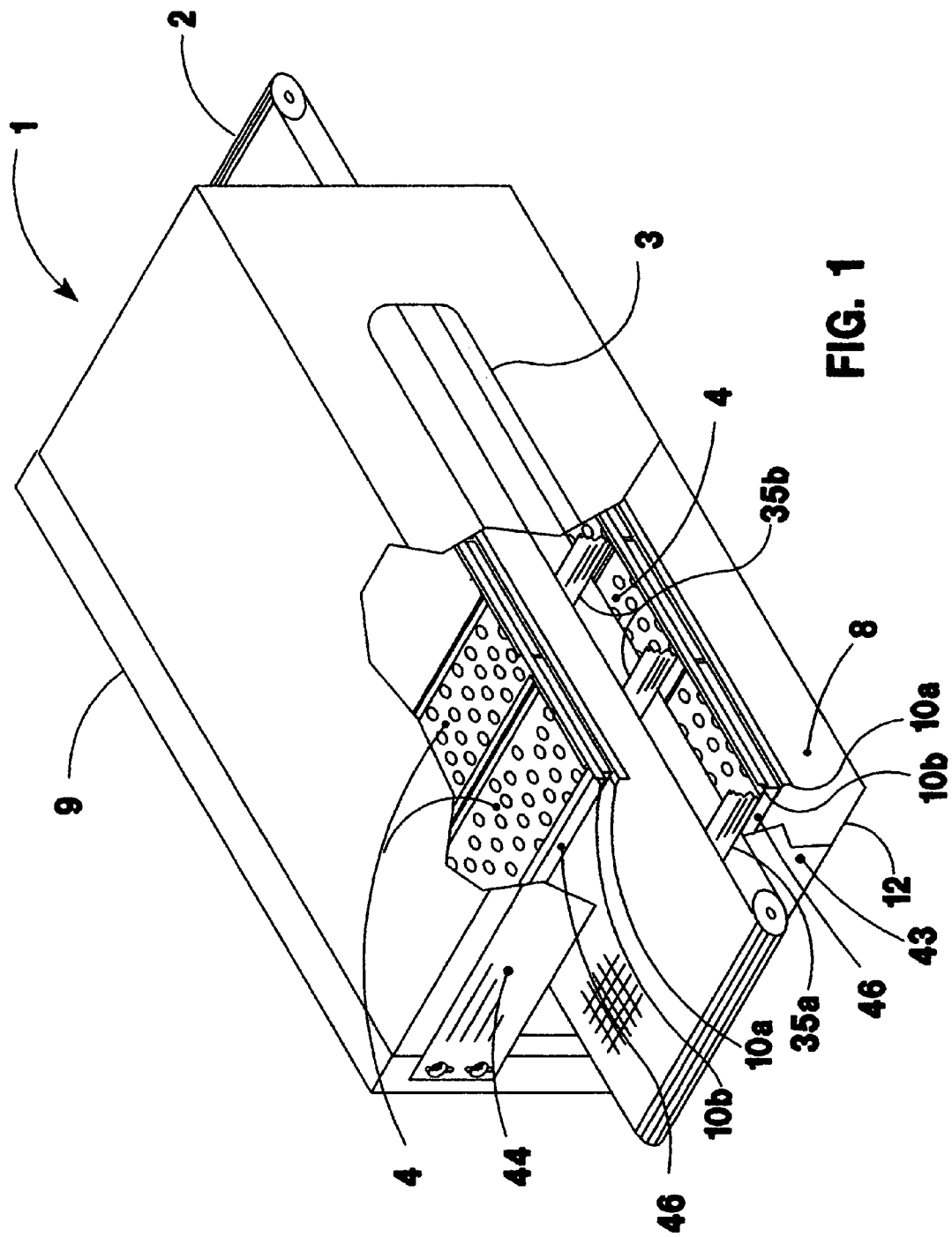
FIG. 1 is a cutaway view of an impingement tunnel oven showing interior and exterior features, and minimal plenum panels.

Referring to FIG. 1, a tunnel oven 1 with a conveyor 2, and with an access door 3 in the front for observation and specialized loading, has a set of nozzle plates 4. Nozzle plates 4 on top jet hot air directly onto the food being cooked, and nozzle plates 4 on the bottom jet hot air through a mesh conveyor belt to heat food or food carrying trays.

One or two motors and blowers supplying operational air to multiple nozzle plates are common, but may be increased for a very large oven. The motor and drive belt or coupling may be conventional and are not detailed.

FIGS. 1, 2, and 3 show the preferred embodiment of nozzle plate 4 and nozzle plenum 8 structures. No panels or walls integral to the nozzle plate are used. It is not necessary that individual nozzle plates 4 be parts of individual plenums. By not using separation panels between the nozzle plates, the space under the bottom nozzles will function as a single large plenum. If no separation panels are used on top, the space above the top nozzles will function as a single large plenum. Separation panels for individual plenums running from the front to the back of the plenum are optional, but are not necessary. The removable access panels 43 and 44, and end panels 22 (FIG. 9) may serve as closing panels for the plenums. The short bent portions of nozzle plate 4 are nozzle plate stiffeners 46. Nozzle plate stiffener 46 is similar in shape to panels (attached to nozzle plates) 7 of the alternative embodiments illustrated in FIGS. 5 and 6, but short bent portions 46 serve to provide stiffness to the nozzle plate to prevent heat warping or accidental bending during handling. Stiffeners 46 may be located anywhere on nozzle plate 4 as needed, may be corrugations in the plate, or may be omitted entirely if the plate itself has adequate inherent stiffness to prevent warping during heating or handling. Edge mounting of stiffeners 46 is preferable for economy. Edge stiffeners are economical folds in sheet metal stock. Support is provided by rails 10a (FIGS. 1 and 3), and optional rails 10b may be added. Rails 10a and 10b can be used as labyrinth seals for the plenums. Rails 10b may be added to prevent end users from lifting the bottom nozzle plates into the conveyor, or for other requirements. The support may be continuous rails or portions of rails. To suit engineering requirements panels, walls, channels, or other engineered systems may be substituted for the rails. Other support systems are described in the alternative embodiment section.

For an oven of the size previously described, the nozzle plates could be approximately 11 inches by 34 inches. The depth of the plenum could be approximately 4 inches. Nozzle plate 4 has an array of engineered nozzles 39 in rows and columns. The nozzles are spaced approximately 2 inch on centers. The columns are offset ⅓ of the spacing, thus the columns are in sets of 3, and repeat every fourth column. Thus, dense air impingement coverage "paints" food with hot air. Of course these dimensions are illustrative only, and may be varied to suit engineering and other requirements.

The preferred nozzle is shown in FIG. 7. The funnel-shaped entrance of an engineered nozzle 39 channels air 37 to form a smooth jet stream of impingement air. Apertures of different sizes and shapes may be used to suit different requirements.

Nozzle plenums 8 are the spaces below the bottom nozzle plates and above the top nozzle plates in the treatment chamber. These nozzle plenums are designed for receiving pressurized air from a blower wheel 11 (FIGS. 3, 8 and 9).

Figure 8:
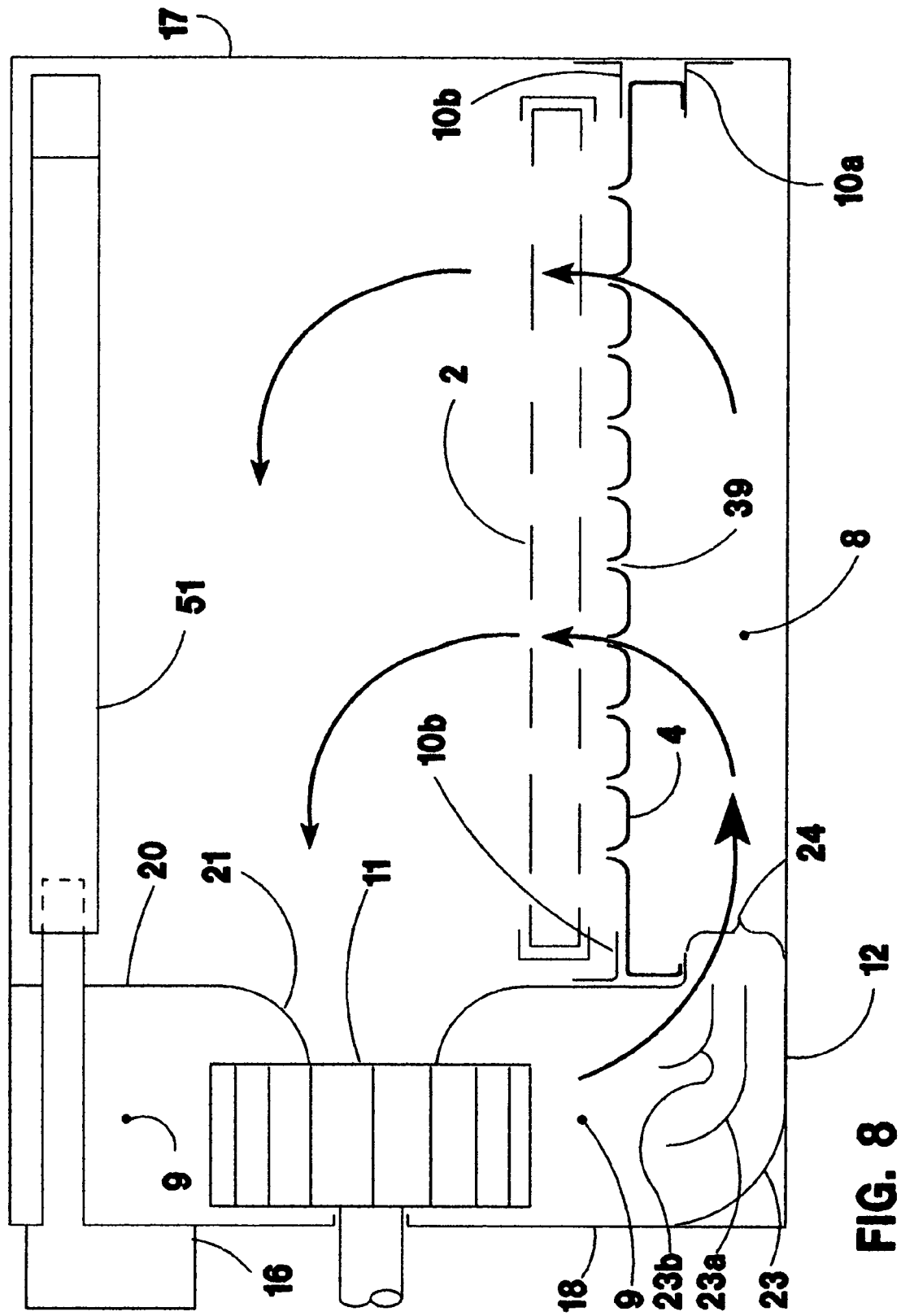
FIG. 8 is a sectional view showing details of the placement of lower nozzle plates in an impingement tunnel oven, a heat source, and details of an air circuit.

Referring to FIG. 8, the lower nozzle plates are approximately 1 inch under the bottom of conveyor 2. Since the conveyor is usually an open mesh of linked stainless steel wire, there is little interference with the flow of the jet streams of impingement air.

This arrangement permits nozzle plates 4 to be removed from the oven through the ends after quickly removing access panels 43 and 44 (FIG. 1) to provide openings. This allows the conveyor and the oven front to remain in place when the nozzle plates are being removed. Access panels 43 and 44 on both oven ends are attached to the oven body with simple fasteners. The panels may also be attached to nozzle plates next to the openings. Fast-out and fast-in nozzle plates result in fast and easy cleaning.

Upper access panels 44 on each oven end have openings for inserting and exiting of the product being cooked. Access panels 44 are adjustable or have an adjustable sliding panel that is set relative to the products being cooked.

FIG. 17 is of a suitable nozzle plate removing tool 47. The tool is comprised of a handle 49, a long shank 48, and an end hook 50. The hook portion is inserted into engineered nozzle 39 so nozzle plate 4 can be removed. FIG. 17 is only illustrative of how the tool may be constructed. Other configurations may be used. At minimum, adequately gloved hands may be used to remove the fast-out and fast-in nozzle plates.

Referring to FIGS. 8 and 9, a blower plenum 9 is comprised of back panel 20 of the treatment chamber, an inlet port 21 to blower wheel 11, a rear panel 18, end panels 22, an oven bottom panel 12, an oven top panel 13, and optional air-turning deflectors vanes 23, 23a, 23b. Blower plenum 9 receives air that is pressurized by the blower wheel. The pressurized air then flows into openings 24 supplying nozzle plenums 8, which then supply nozzle plates 4. Then, as the pressurized air flows through engineered nozzles 39, it is formed into jet impingement streams for cooking. The air then returns to blower 11, completing an extremely efficient air circuit.

Air-turning deflectors vanes 23, 23a, 23b may be used to produce a smoother laminar flow injection into nozzle plenum 8, but the vanes are optional. Other anti-swirl devices may be included in openings 24. The deflector vanes and anti-swirl devices have not been necessary in full-scale prototypes. Several alternative embodiments are described in the section titled "Alternative Embodiments and Variations of the Invention".

Inlet port 21 and a return air opening 19 are in back panel 20 of the treatment chamber. Return air is drawn from the treatment chamber preferably with one blower wheel, although multiple blower wheels may perform better for some oven sizes. Whether one or multiple blower wheels are used, the air circuits are extremely efficient.

FIGS. 3 and 8 carry notation indicating the path of the air circuit from nozzle plates 4 in the bottom of the treatment chamber. The path of the air circuit from nozzle plates 4 in the top of the treatment is almost identical, but originates from the top. Fewer turns and lower jet velocity permit the use of a less powerful blower motor, therefore less energy consumption.

Blower wheel 11 draws air from the treatment chamber directly through back panel 20 (FIG. 8). Thus, the oven does not require any excessive turns of the airflow. The prior art fingers ducts have the convoluted air circuits that go above the top finger ducts and below the bottom finger ducts to the return air spaces that are connected to the return ducts that extend to the back of the prior art oven. At the back of the prior art oven the air turns to enter the back plenum, turns again to enter the blower wheel, discharges into another plenum, and then air is finally supplied to the prior art finger ducts.

FIGS. 3, 8, and 9 show the air circuit's heat source for the preferred embodiment. The preferred heat source is at least one natural gas, propane, or similar burner. Electric heating elements in the treatment chamber are also practical. Unlike the prior art, which injects burner heat into the back blower plenum in a very confined area, the present invention allows the air from the heat source to be spread immediately over a very large space of the treatment chamber. This wide heat distribution significantly reduces thermal losses through exterior panels, and minimizes heat on components. Heat loss is even further minimized with this improvement when ovens are stacked.

A heat source 16 may be placed above the conveyor, below the conveyor, or both above and below the conveyor depending upon the products being manufactured. The heat source from a forced air gas burner may be placed above and/or below the conveyor by using a heat diffusing tube 51, and the burner may be located on any side of the oven. The heat source from electric elements located inside the treatment chamber may be placed above and/or below the conveyor by using insulated heat resistant wire to supply electric current, and an electrical feed may be located on any side of the oven. The heat source from a gas burner located inside the treatment chamber may be placed above and/or below the conveyor, and a gas supply to the internal burner may be located on any side of the oven.

Figure 19:
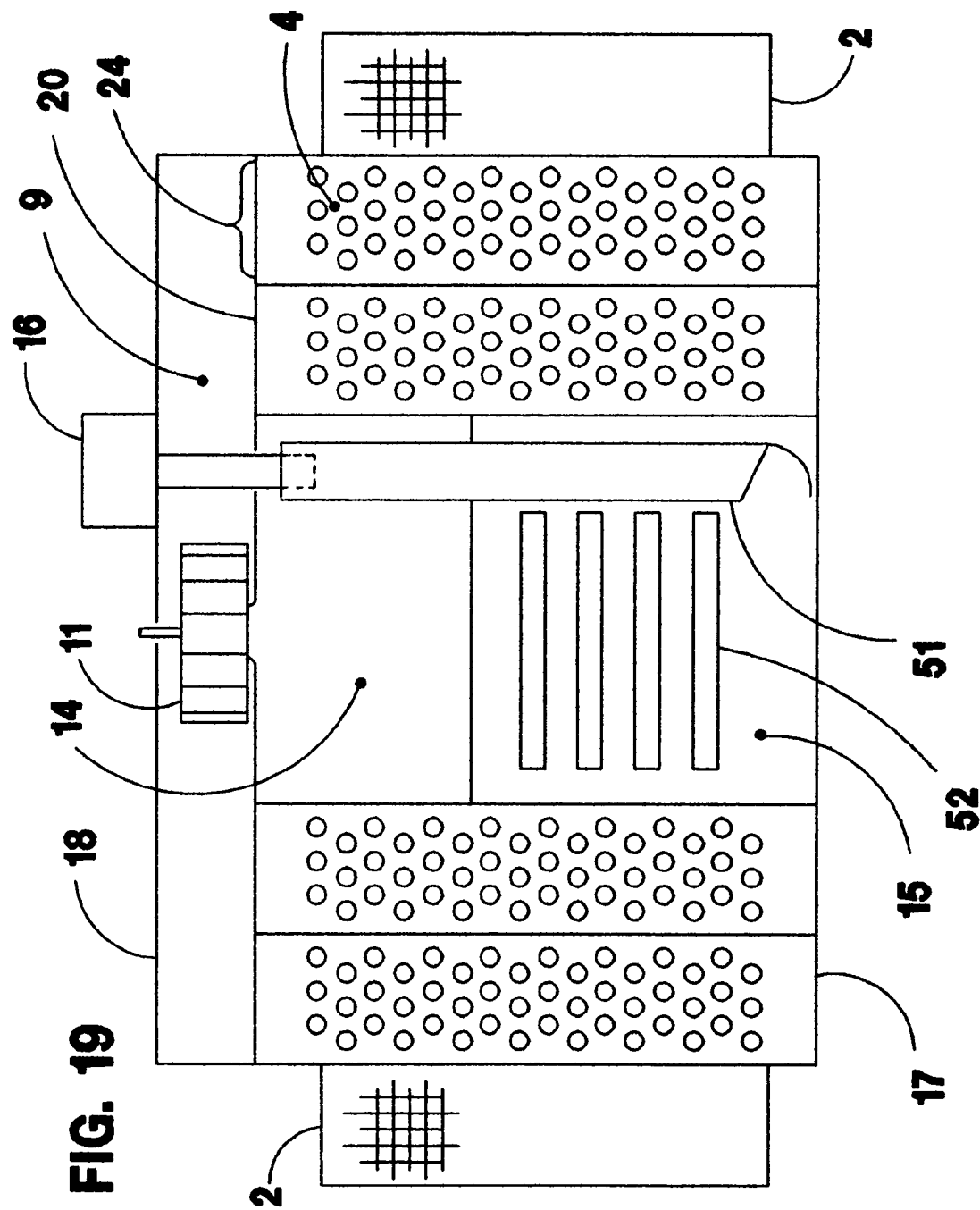
FIG. 19 is a sectional view showing details of the placement of a heat source.
Figure 20:
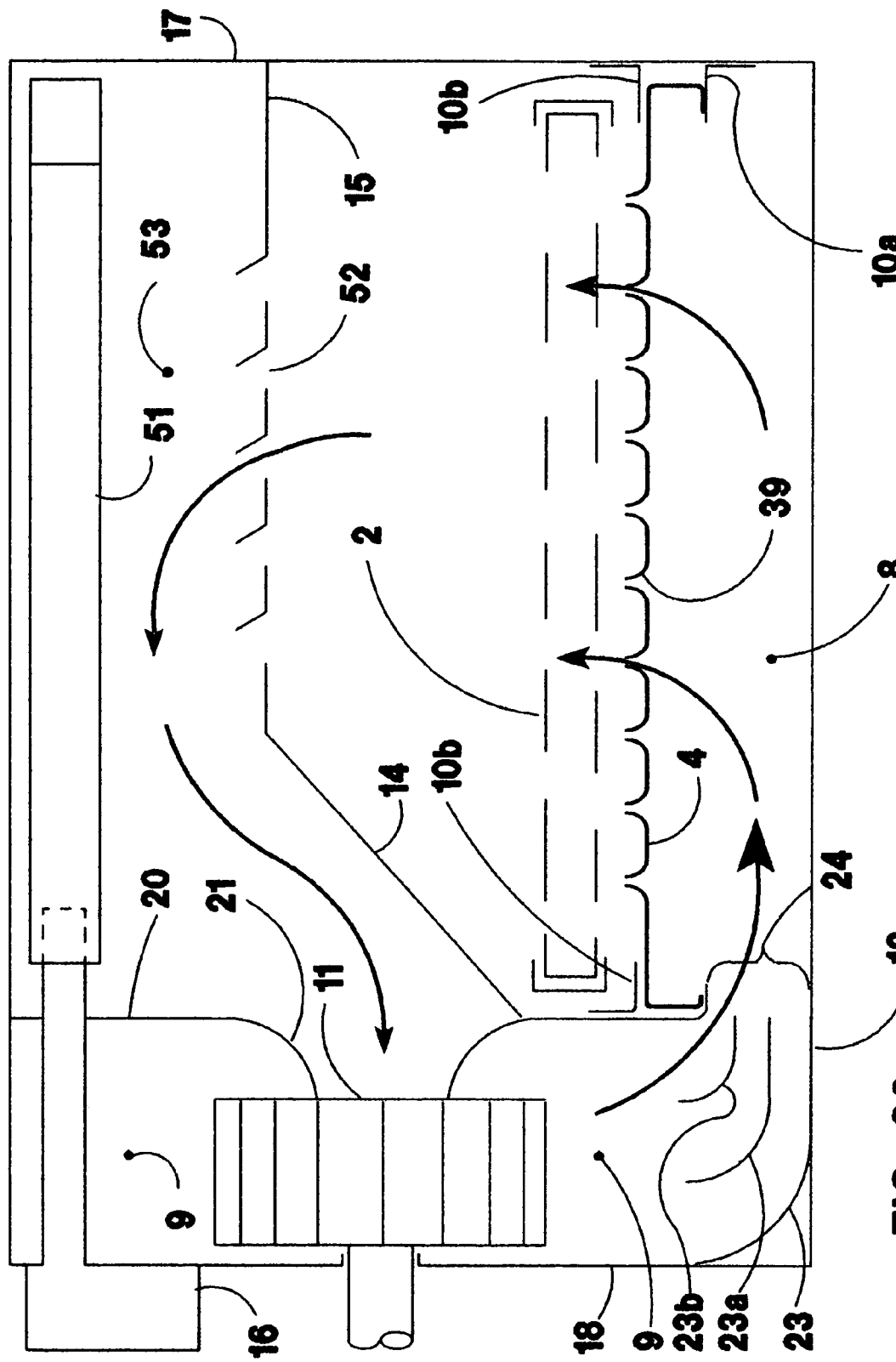
FIG. 20 is a sectional view showing details of the placement of lower nozzle plates in an impingement tunnel oven, a heat source, and optional details of an air circuit.

FIGS. 3, 8, 19 and 20 illustrate the oven with heat source 16 as a burner projecting through heat diffusing tube 51, which pipes hot burner gas into the top of the treatment chamber. Tube 51 may be different shapes, sizes, and configurations; and may be constructed with many different apertures. Heat source 16 and tube 51 are illustrated above the conveyor and between upper nozzle plenums 8. FIGS. 19 and 20 show another embodiment having louvered, 52, closing panels, 15, fixed onto the edges of the innermost plenum walls or to top panel 13, thus separating the upper nozzle plenums from the burner gas. Blower wheel 11 draws and blends higher temperature air from heat source and lower temperature return air.

FIGS. 19 and 20 illustrate an optional safety shield and a baffle 14 that may be added for safety reasons, and to shape the area for airflow to the blower. Baffle 14 is also a panel of an optional return air plenum. A large space in the area of baffle 14 enhances the mixing initiated in a space over an optional louvered panel 15.

FIGS. 19, and 20 also illustrate optional louvered panel 15 with directional vents. Panel 15 is used to assist blending of the higher temperature heat source air and the lower temperature return air. Panel 15 creates a return plenum 53. Blower 11 creates a pressure difference between the food-cooking area and return plenum 53, thereby causing air to flow through louvered slots 52 in panel 15. This air is directed across the path of the hot burner air, thus causing turbulence and mixing. Holes, slots, or other apertures may be substituted for louvered slots 52. Airflow efficiency is maintained by providing large cross sections in all areas, and minimizing airflow direction changes.

Baffle 14 may be used with or without louvered panel 15. When used with panel 15, side panels are added to baffle 14. With side panels, more air will enter through louvered slots 52. When baffle 14 is used alone, side panels are optional.

A heat source may be used in the bottom of the treatment chamber in conjunction with the top heat source, or may be used alone. The bottom heat source may be used with optional baffle 14 and optional louvered panel 15 placed in the bottom.

Figure 4:
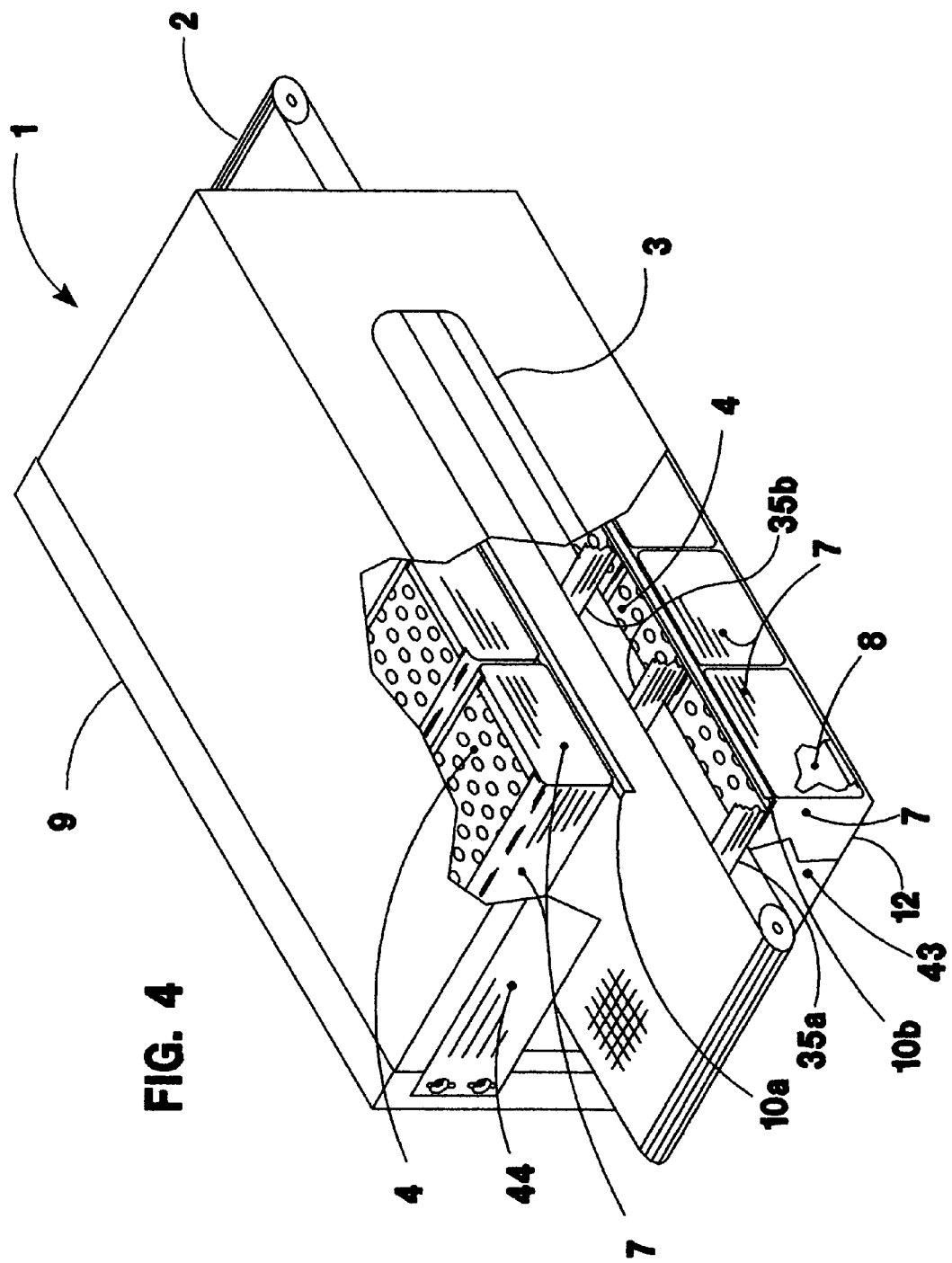
FIG. 4 is a cutaway view showing plenum panels integral with nozzle plates.

The jet impingement streams create a "splash" at a food surface, thus producing a horizontal airflow. This pushes hot air along the longitudinal axis of the conveyor between the top and bottom conveyor levels, and then out the oven ends. Referring to FIGS. 1 and 4, to stop this leakage, a conveyor barrier 35a is placed between the conveyor levels and extends fully across the oven at each end of the tunnel. Conveyor barrier 35a is shown as a panel, but may just as well be a cylinder, roller, channel section, rectangular tube stock, etc., and may be a structural part of the conveyor frame.

Similar secondary barriers 35b are used within the conveyor inside the tunnel. Conveyor barriers 35b serve to reduce air currents flowing towards the oven ends.

HOW TO USE THE INVENTION

When the present invention requires cleaning, the following procedure is recommended:
1. Turn off the gas burner or other heat source.
2. Turn off the conveyor.
3. Cooling the oven is optional, but unnecessary.
3. Remove access panels 43 and 44 to expose nozzle plates 4.
4. Remove the nearest nozzle plate using removing tool 47, or a similar tool that may include adequately gloved hands. The tool is designed so that the end of the hook can be inserted into a nozzle hole.
5. Remove the other nozzle plates through the open ends of the oven.
6. Clean the oven of any crumbs.
7. Wash the nozzle plates.
8. Reassemble by inserting nozzle plates and attaching access panels 43 and 44.

The nozzle plates are scrubbed manually or in a dishwasher, and the bottom can be cleaned with a brush or a vacuum. All of this can be done with the oven hot. There is no need to remove the conveyor or the oven front.

ALTERNATIVE EMBODIMENTS AND VARIATIONS OF THE INVENTION

FIG. 4 is an alternative embodiment of that shown in FIG. 1. Referring to FIGS. 5, 6, and 9, bottom nozzle plates 4 are supported on panels (attached to nozzle plates) 7, which extend from a nozzle plate edge to oven bottom panel 12. Panels 7 also extend from top nozzle plates 4 to oven top panel 13. Panels 7 may provide stiffness to the sheet metal nozzle plates, and may serve as enclosures for nozzle plenum spaces 8. A nozzle plate support foot 41 may act as a stiffener, may be used to removably attach the nozzle plates to the top and bottom oven panels, or may be omitted. A plenum end stiffener 42 may be added.

A variation of the embodiments shown in FIGS. 5 and 6 is to have only one panel 7, which serves as a divider between individual plenums. Nozzle plate 4 will have to be supported by legs, or rails 10a, or other engineered supports. Panels 7 may be attached to an area other than the edges of nozzle plates 4 to suit different requirements.

FIG. 18 is an alternative embodiment of that shown in FIG. 4. The embodiment shown in FIG. 18, uses panels (extending from plenums) 6 to divide the plenum into smaller nozzle plenums 8, and/or different size nozzle plenums 8, and may support nozzle plates 4. Other features remain the same.

Accordingly, a second embodiment based on the embodiment shown in FIG. 18 may omit transverse panels 6. Longitudinal panels 6 may be continuous for the length of the oven. These longitudinal panels may serve to support the nozzle plates.

One or more nozzle plate and associated plenum section may be omitted. Then, closing panels are fixed onto adjacent nozzle plates, or to oven bottom panel 12 or to oven top panel 13 as needed.

Referring to FIGS. 8 and 9, the air in blower plenum 9 will have considerable swirling components and/or uneven pressures at openings 24. The air in nozzle plenum 8 should not swirl significantly, so a panel with apertures, or a set of vertical or horizontal vanes may be attached to opening 24. FIGS. 10 and 11 illustrate a set of vanes 25 or apertures 26 attached to the openings of a nozzle plenum box.

FIG. 12 shows an alternative placement for an anti-swirl inner aperture panel 27, between opposite corners of a nozzle plenum box. The larger panel has more area for apertures. Round holes, slots, woven wire screening, etc. may be used for air control.

It is intended that nozzle plenums 8 and 29 shown in FIGS. 4, 5, 6, 10, 11, 12 and 14 to not have enclosing panels opposite the nozzle plates. However, the oven will work with enclosing panels. An enclosing panel in the rectangular box embodiments will neutralize the force on nozzle plate 4 caused by pressurized air, and improve the seal around the box feet.

FIG. 13 illustrates an alternative embodiment utilizing a tapered air channel panel 28 to create a tapered nozzle plenum in a rectangular nozzle plenum box.

Figure 14:
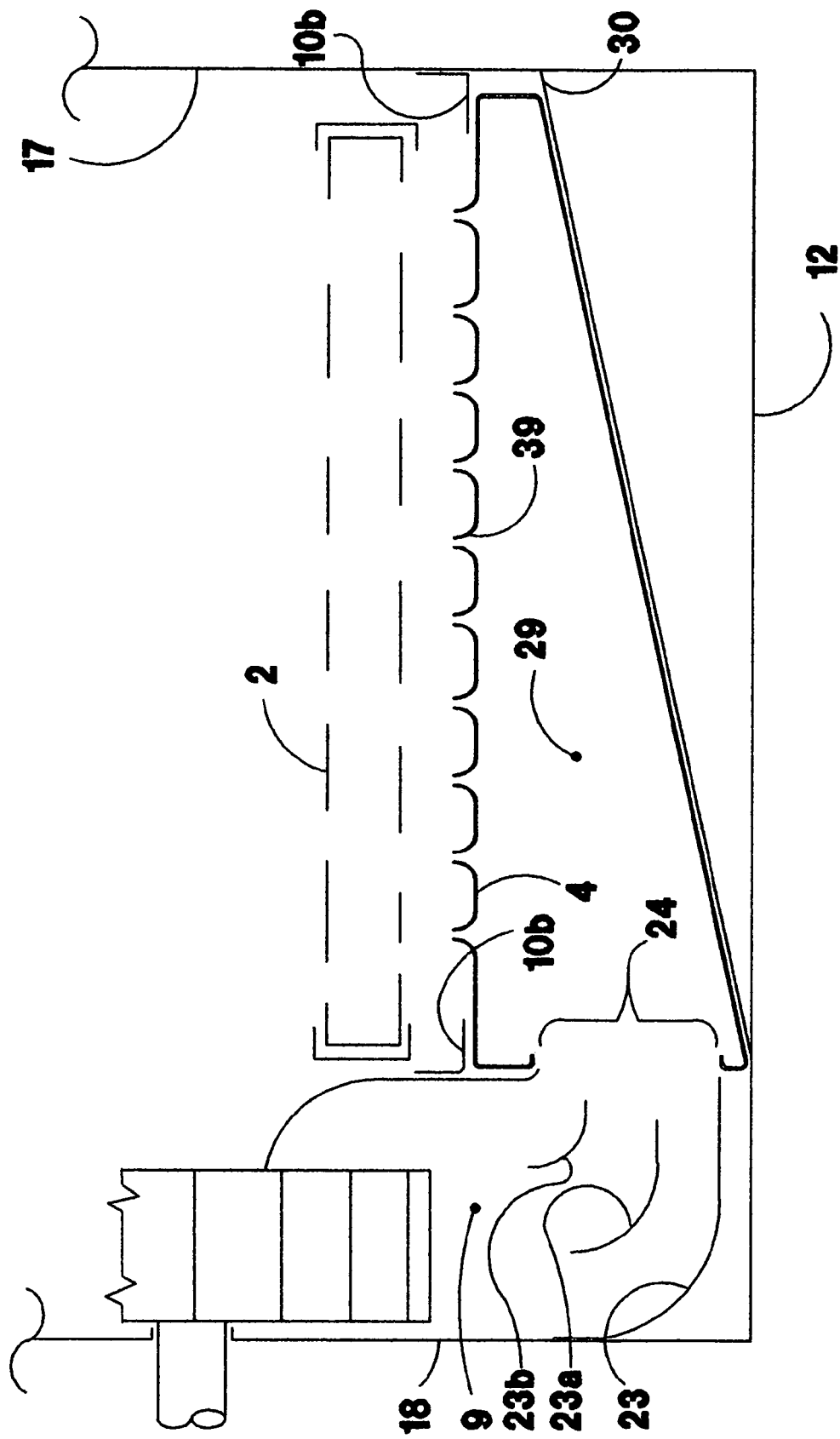
FIG. 14 is a sectional view showing a nozzle plenum with a tapered air channel resting on a sloped floor.

An enclosing panel in the tapered embodiment of FIG. 14 will eliminate pressure on the small far panel of the plenum. Pneumatic forces that tend to push the box embodiments toward the front of the oven are applied to a fixed sloped floor 30.

Tapered nozzle plenums are not the preferred embodiment for the present invention, but they will perform at least as well as the finger ducts of the prior art. FIGS. 13, 14, 15, and 16 illustrate alternative embodiments utilizing tapered nozzle plenum 29.

An angled rail system 33 is shown in FIG. 15. A leg and foot support 31 shown in FIG. 16 may be struts attached to the distal end of a tapered nozzle plenum, a plate structure with stiffeners and foot folded into the edges in a similar fashion that the box plenum uses for the end panel, or other structural systems.

The embodiments shown in FIGS. 13, 14, 15, and 16 may be used for retrofitting or remodeling prior art ovens. Then the prior art ovens will benefit from the present invention's easy fast-out and fast-in nozzle plates without removing the conveyor assembly or the front of the oven. Prior art ovens using between-the-finger ducts return air paths will require a spacing system between the new nozzle plates.

Although the above description is centered on removing the fast-out and fast-in nozzle plates through access openings on the ends of the oven, the functional equivalent can be accomplished by having access openings on the front of the oven, thereby permitting the nozzle plates to be removed through the front of the oven. Transverse rails may be added to the oven, or other support systems may be used to removably attach the nozzle plates to the treatment chamber.

The invention has been described with particular application as a cooking system. However, the features and overall design are quite applicable for use as a cooling chamber or a quick freezer. In cooling and freezing applications, the heat source is replaced with a chilling system operably connected to a refrigeration machine. When the invention is used as a dryer, a dry heat such as from an electric element or a heated heat exchanger replaces the moist heat source of a gas flame.

While the present invention is described in terms of being a pizza and other food cooking device, it is intended that other usages be included within the coverage of the patent. These include, but are not limited to cooking products other than food, as a cooling chamber, as a drying chamber, as a heating device for curing plastics and the like, and as a flash freezing chamber, and similarly constructed devices are to be included as inherently within the scope of the attached claims.

The foregoing description has been directed to specific embodiments for the purposes of illustration. Many variations and modifications designed for the same applications or other applications are possible without departing from the principles of the invention. Other embodiments are within the spirit and scope of the invention as claimed below.

The invention claimed is:

1. I claim an air impingement tunnel type conveyor oven comprising:
   a. an oven chamber comprising a cooking zone, a conveyor extending at least partially out of the oven for transporting materials therethrough, and
   b. at least one plenum substantially co-extensive with at least one removable nozzle plate containing an array of nozzles, wherein said plenum is defined at least in part by a portion of a top or bottom panel of said cooking chamber, said plenum fixed with respect to the oven, and
   c. a means for heating and circulating air providing pressurized heated air to said plenum wherein said nozzles form jets of heated air extending into the cooking zone of said oven chamber and impinging on food being cooked,
   d. thence the heated air of said jets is recirculated and reheated by said heating and recirculating means, and
   e. where said recirculating air does not exit the cooking chamber through said nozzle plate.

2. The oven of claim 1 where said air heating means is a burner injecting heat directly into said oven chamber.

3. The oven of claim 1 where said nozzle plate is removable from said plenum by sliding on first and second co-operating guide rails one each fixedly attached to the front and back panels of said oven chamber.

4. The oven of claim 1 further comprising at least one removable panel on at least one end of said oven chamber and adjacent to said nozzle plate, whereby when said end panel is removed, said nozzle plate is exposed and withdrawable through the open end of said oven chamber.

5. The oven of claim 1 where said nozzle plate is a plurality of nozzle plates aligned co-planarly as aperture covers for said plenum.

6. The oven of claim 1 where said plenum extends from the back wall to the front wall of said oven chamber.

7. I claim an air impingement tunnel type conveyor oven comprising:
   a. an oven chamber comprising a cooking zone, a conveyor for transporting materials therethrough, and b. at least one plenum extending from the back wall to the front wall of said oven chamber and substantially co-extensive with at least one removable nozzle plate containing an array of nozzles, wherein said plenum is defined at least in part by a portion of a top or bottom panel of said cooking chamber, said plenum fixed with respect to the oven, and c. a means for heating and circulating air providing pressurized heated air to said plenum wherein said nozzles form jets of heated air extending into the cooking zone of said oven chamber and impinging on food being cooked, d. thence the heated air of said jets is recirculated and reheated by said heating and recirculating means, and e. said oven chamber further comprising at least one removable end panel adjacent to said plenum, and first and second guide rails supporting said nozzle plate, said guide rails being fixedly attached to the front and back walls of said oven chamber, f. whereby when said end panel is removed said nozzle plate is exposed and withdrawable from said oven chamber through the open end of said oven chamber.

8. The oven of claim 7 where said air heating means is a burner injecting heat directly into said oven chamber.

9. The oven of claim 7 where said nozzle plate is a plurality of nozzle plates aligned co-planarly on said guide rails.

10. The oven of claim 7 where the front wall of said plenum is comprised of a portion of said front wall of said oven chamber.

11. The oven of claim 1 wherein two or more adjacent nozzle plates are removable and slide on rails.

12. The oven of claim 1 wherein two or more top nozzle plates are removable and slide on rails.

13. The oven of claim 1 wherein two or more bottom nozzle plates are removable and slide on rails.

* * * * *